United States Patent
Lightner et al.

(10) Patent No.: US 9,613,166 B2
(45) Date of Patent: Apr. 4, 2017

(54) SEARCH SUGGESTIONS OF RELATED ENTITIES BASED ON CO-OCCURRENCE AND/OR FUZZY-SCORE MATCHING

(71) Applicant: QBASE, LLC, Reston, VA (US)

(72) Inventors: Scott Lightner, Leesburg, VA (US); Franz Weckesser, Spring Valley, OH (US); Sanjay Boddhu, Dayton, OH (US)

(73) Assignee: QBase, LLC, Reston, VA (US)

( * ) Notice: Subject to any disclaimer, the term of this patent is extended or adjusted under 35 U.S.C. 154(b) by 0 days.

(21) Appl. No.: 14/920,580

(22) Filed: Oct. 22, 2015

(65) Prior Publication Data
US 2016/0042001 A1 Feb. 11, 2016

Related U.S. Application Data

(63) Continuation of application No. 14/558,159, filed on Dec. 2, 2014, now Pat. No. 9,230,041.
(Continued)

(51) Int. Cl.
*G06F 17/30* (2006.01)
(52) U.S. Cl.
CPC ...... *G06F 17/3097* (2013.01); *G06F 17/3053* (2013.01); *G06F 17/30312* (2013.01);
(Continued)
(58) Field of Classification Search
None
See application file for complete search history.

(56) References Cited

U.S. PATENT DOCUMENTS 6,128,660 A 10/2000 Grimm et al.
6,178,529 B1 1/2001 Short et al.
(Continued)

FOREIGN PATENT DOCUMENTS

WO 2013/003770 A2 1/2013

OTHER PUBLICATIONS

International Search Report and Written Opinion dated Mar. 3, 2015, corresponding to International Patent Application No. PCT/US2014/067921, 10 pages.
(Continued)

*Primary Examiner* — Jay Morrison
(74) *Attorney, Agent, or Firm* — Eirc L. Sophir; Dentons US LLP

(57) ABSTRACT

A method for generating search suggestions of related entities based on co-occurrence and/or fuzzy score matching is disclosed. The method may be employed in a search system that may include a client/server type architecture. The search system may include a user interface for a search engine in communication with one or more server devices over a network connection. The server device may include an entity extraction module, a fuzzy-score matching module, and an entity co-occurrence knowledge base database. In one embodiment, the search system may process a partial search query from a user and present search suggestions to complete the partial query. In another embodiment, the complete search query may be used as a new search query. The search system may process the new search query, run an entity extraction, find related entities from the entity co-occurrence knowledge base, and present said related entities in a drop down list.

20 Claims, 3 Drawing Sheets

Related U.S. Application Data

(60) Provisional application No. 61/910,905, filed on Dec. 2, 2013.

(52) U.S. Cl.
CPC .. *G06F 17/30542* (2013.01); *G06F 17/30554* (2013.01); *G06F 17/30867* (2013.01); *G06F 17/30973* (2013.01)

(56) References Cited

U.S. PATENT DOCUMENTS

| | | |
|---|---|---|
| 6,226,635 B1 | 5/2001 | Katariya |
| 6,266,781 B1 | 7/2001 | Chung et al. |
| 6,353,926 B1 | 3/2002 | Parthesarathy et al. |
| 6,738,759 B1 | 5/2004 | Wheeler et al. |
| 6,832,373 B2 | 12/2004 | O'Neill |
| 6,832,737 B2 | 12/2004 | Karlsson et al. |
| 7,058,846 B1 | 6/2006 | Kelkar et al. |
| 7,099,898 B1 | 8/2006 | Nakamura et al. |
| 7,370,323 B2 | 5/2008 | Marinelli et al. |
| 7,421,478 B1 | 9/2008 | Muchow |
| 7,447,940 B2 | 11/2008 | Peddada |
| 7,543,174 B1 | 6/2009 | Van Rietschote et al. |
| 7,681,075 B2 | 3/2010 | Havemose et al. |
| 7,818,615 B2 | 10/2010 | Krajewski et al. |
| 7,899,871 B1 | 3/2011 | Kumar et al. |
| 7,984,043 B1 | 7/2011 | Waas |
| 8,055,933 B2 | 11/2011 | Jaehde et al. |
| 8,122,026 B1 | 2/2012 | Laroco et al. |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,589,429 B1 * | 11/2013 | Thirumalai ......... G06F 17/3064 707/729 |
| 8,726,267 B2 | 5/2014 | Li et al. |
| 8,782,018 B2 | 7/2014 | Shim et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 2001/0037398 A1 | 11/2001 | Chao et al. |
| 2002/0031260 A1 | 3/2002 | Thawonmas et al. |
| 2002/0165847 A1 | 11/2002 | McCartney et al. |
| 2002/0174138 A1 | 11/2002 | Nakamura |
| 2003/0028869 A1 | 2/2003 | Drake et al. |
| 2003/0033288 A1 | 2/2003 | Shanahan et al. |
| 2003/0112792 A1 | 6/2003 | Cranor et al. |
| 2003/0158839 A1 | 8/2003 | Faybishenko et al. |
| 2003/0182282 A1 | 9/2003 | Ripley |
| 2004/0010502 A1 | 1/2004 | Bomfim et al. |
| 2004/0027349 A1 | 2/2004 | Landau et al. |
| 2004/0049478 A1 | 3/2004 | Jasper et al. |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2004/0243645 A1 | 12/2004 | Broder et al. |
| 2005/0091211 A1 | 4/2005 | Vernau et al. |
| 2005/0192994 A1 | 9/2005 | Caldwell et al. |
| 2005/0203888 A1 | 9/2005 | Woosley et al. |
| 2006/0101081 A1 | 5/2006 | Lin et al. |
| 2006/0129843 A1 | 6/2006 | Srinivasa et al. |
| 2006/0294071 A1 | 12/2006 | Weare et al. |
| 2007/0005639 A1 | 1/2007 | Gaussier et al. |
| 2007/0027845 A1 | 2/2007 | Dettinger et al. |
| 2007/0100806 A1 | 5/2007 | Ramer et al. |
| 2007/0156748 A1 | 7/2007 | Emam et al. |
| 2007/0174289 A1 | 7/2007 | Utiger |
| 2007/0203693 A1 | 8/2007 | Estes |
| 2007/0203924 A1 | 8/2007 | Guha et al. |
| 2007/0240152 A1 | 10/2007 | Li et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027915 A1 | 1/2008 | Karasudani et al. |
| 2008/0027920 A1 | 1/2008 | Schipunov et al. |
| 2008/0077570 A1 | 3/2008 | Tang et al. |
| 2008/0155607 A1 | 6/2008 | Klappert |
| 2008/0270389 A1 | 10/2008 | Jones et al. |
| 2008/0306908 A1 | 12/2008 | Agrawal et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0222395 A1 | 9/2009 | Light et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0010989 A1 | 1/2010 | Li et al. |
| 2010/0077001 A1 | 3/2010 | Vogel et al. |
| 2010/0138931 A1 | 6/2010 | Thorley et al. |
| 2010/0223264 A1 | 9/2010 | Brucker et al. |
| 2010/0235311 A1 | 9/2010 | Cao et al. |
| 2010/0251305 A1 | 9/2010 | Kimble et al. |
| 2010/0274785 A1 | 10/2010 | Procopiuc et al. |
| 2011/0029636 A1 | 2/2011 | Smyth et al. |
| 2011/0071975 A1 | 3/2011 | Friedlander et al. |
| 2011/0093471 A1 | 4/2011 | Brockway et al. |
| 2011/0099163 A1 | 4/2011 | Harris et al. |
| 2011/0119243 A1 | 5/2011 | Diamond et al. |
| 2011/0125764 A1 | 5/2011 | Carmel et al. |
| 2011/0161333 A1 | 6/2011 | Langseth et al. |
| 2011/0264679 A1 | 10/2011 | Dettinger et al. |
| 2011/0282888 A1 | 11/2011 | Koperski et al. |
| 2011/0296390 A1 | 12/2011 | Vidal et al. |
| 2011/0296397 A1 | 12/2011 | Vidal et al. |
| 2012/0030220 A1 | 2/2012 | Edwards et al. |
| 2012/0047025 A1 | 2/2012 | Strohman |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0143875 A1 | 6/2012 | Sarma et al. |
| 2012/0246154 A1 | 9/2012 | Duan et al. |
| 2012/0254224 A1 | 10/2012 | Thompson |
| 2012/0310934 A1 | 12/2012 | Peh et al. |
| 2012/0323839 A1 | 12/2012 | Kiciman et al. |
| 2013/0132405 A1 | 5/2013 | Bestgen et al. |
| 2013/0144605 A1 | 6/2013 | Brager et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2013/0311485 A1 | 11/2013 | Khan |
| 2014/0013233 A1 | 1/2014 | Ahlberg et al. |
| 2014/0022100 A1 | 1/2014 | Fallon et al. |
| 2014/0074784 A1 | 3/2014 | Mao et al. |
| 2014/0149446 A1 | 5/2014 | Kuchmann-Beauger et al. |
| 2014/0156634 A1 | 6/2014 | Buchmann et al. |
| 2014/0244550 A1 | 8/2014 | Jin et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0149481 A1 | 5/2015 | Lee et al. |
| 2015/0154079 A1 | 6/2015 | Lightner et al. |
| 2015/0154264 A1 | 6/2015 | Lightner et al. |
| 2015/0154297 A1 | 6/2015 | Lightner et al. |

OTHER PUBLICATIONS

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

(56) References Cited

OTHER PUBLICATIONS

International Search Report and Written Opinion of the International Searching Authority dated Apr. 15, 2015 corresponding to International Patent Application No. PCT/US2014/068002, 10 pages.
International Search Report and Written Opinion dated Feb. 24, 2015 corresponding to International Patent Application No. PCT/US2014/0067918, 10 pages.
Tunkelang, D. "Faceted Search," Morgan & Claypool Publ., 2009, pp. i-79.
Schuth, A., et al., "University of Amsterdam Data Centric Ad Hoc Faceted Search Runs," ISLA, 2012, pp. 155-160.
Tools, Search Query Suggestions using ElasticSearch via Shingle Filter and Facets, Nov. 2012, pp. 1-12.
International Search Report and Written Opinion of the International Searching Authority dated Apr. 15, 2015, corresponding to International Patent Application No. PCT/2014/067994, 9 pages.
International Search Report dated Apr. 15, 2015 corresponding to International Patent Application No. PCT/US2014/067997, 4 pages.
Written Opinion of the International Searching Authority dated Apr. 15, 2015 corresponding to International Patent Application No. PCT/US2014/067997, 9 pages.

\* cited by examiner

SEARCH SUGGESTIONS OF RELATED ENTITIES BASED ON CO-OCCURRENCE AND/OR FUZZY-SCORE MATCHING

CROSS-REFERENCE TO RELATED APPLICATIONS

This application claims priority to and is a continuation of co-pending U.S. patent application Ser. No. 14/558,159 entitled "Search Suggestions of Related Entities Based on Co-Occurrence and/or Fuzzy-Score Matching," filed Dec. 2, 2014, which claims priority to U.S. Provisional Application No. 61/910,905, filed Dec. 2, 2013, entitled "Search Suggestions of Related Entities Based on Co-Occurrence and/or Fuzzy-Score Matching," which is hereby incorporated by reference in its entirety.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/558,101, entitled "Non-Exclusionary Search Within In-Memory Databases," filed Dec. 2, 2014; and U.S. patent application Ser. No. 14/558,036, entitled "Search Suggestions Fuzzy-Score Matching and Entity Co-Occurrence," filed Dec. 2, 2014; each of which are incorporated herein by reference in their entirety.

TECHNICAL FIELD

The present disclosure relates generally to computer query processing, and more specifically to electronic search suggestions of related entities based on co-occurrence and/or fuzzy score matching.

BACKGROUND

Users frequently use search engines for locating information of interest either from the Internet or any database system. Search engines commonly operate by receiving a search query from a user and returning search results to the user. Search results are usually ordered based on the relevance of each returned search result to the search query. Therefore, the quality of the search query may be significantly important for the quality of search results. However, search queries from users, in most cases, may be written incomplete or partial (e.g., the search query may not include enough words to generate a focused set of relevant results and instead generates a large number of irrelevant results), and sometimes misspelled (e.g., Bill Smith may be incorrectly spelled as "Bill Smith").

One common approach to improve the quality of the search results is to enhance the search query. One way to enhance the search query may be by generating possible suggestions based on the user's input. For this, some approaches propose methods for identifying candidate query refinements for a given query from past queries submitted by one or more users. However, these approaches are based on query logs that sometimes may lead the user to results that may not be of interest. There are other approaches using different techniques that may not be accurate enough. Thus, there still exists a need for methods that improve or enhance search queries from users to get more accurate results and also present users with useful related entities of interest as they type the search query.

SUMMARY

A method for generating search suggestions of related entities based on co-occurrence and/or fuzzy score matching is disclosed. In one aspect of the present disclosure, the method may be employed in a computer search system that may include a client/server type architecture. In one embodiment, the search system may include a user interface to a search engine in communication with one or more server devices over a network connection. The server device may include one or more processors executing instructions for a plurality of special purpose computer modules, including an entity extraction module and a fuzzy-score matching module, as well as an entity co-occurrence knowledge base database. The knowledge base may be built as an in-memory database and may also include other components, such as one or more search controllers, multiple search nodes, collections of compressed data, and a disambiguation module. One search controller may be selectively associated with one or more search nodes. Each search node may be capable of independently performing a fuzzy key search through a collection of compressed data and returning a set of scored results to its associated search controller.

In another aspect of the present disclosure, the method may include performing partial entity extractions, by an entity extraction module, from provided search queries to identify whether the search query refers to an entity, and if so, to determine the entity type. Furthermore, the method may include generating algorithms, by a fuzzy-score matching module, corresponding to the type of entity extracted and performing a search against an entity co-occurrence knowledge base. Additionally, the query text parts that are not detected as entities are treated as conceptual features, such as topics, facts, and key phrases that can be employed for searching the entity co-occurrence knowledge base. The entity co-occurrence knowledge base, which may already have a repository where entities may be indexed as entities to entities, entities to topics, or entities to facts, among others, may return fast and accurate suggestions to the user to complete the search query.

In a further aspect of the present disclosure, the completed search query may be used as a new search query. The search system may process the new search query, run an entity extraction, find related entities with the highest scores from the entity co-occurrence knowledge base, and present said related entities in a drop down list that may be useful for the user.

In one embodiment, a method is disclosed. The method comprises receiving, by an entity extraction computer, user input of partial search query parameters from a user interface, the partial search query parameters having at least one incomplete search query parameter, extracting, by the entity extraction computer, one or more first entities from the partial search query parameters by comparing the partial search query parameters with an entity co-occurrence database having instances of co-occurrence of the one or more first entities in an electronic data corpus and identifying at least one entity type corresponding to the one or more first entities in the partial search query parameters, and selecting, by a fuzzy-score matching computer, a fuzzy matching algorithm for searching the entity co-occurrence database to identify one or more records associated with the partial search query parameters, wherein the fuzzy matching algorithm corresponds to the at least one identified entity type. The method further includes searching, by the fuzzy-score matching computer, the entity co-occurrence database using the selected fuzzy matching algorithm and forming one or more first suggested search query parameters from the one or more records based on the search, presenting, by the fuzzy-score matching computer, the one or more first suggested search query parameters via the user interface, receiving by the entity extraction computer, user selection of the one or more first suggested search query parameters so as to form completed search query parameters, and extracting, by the entity extraction computer, one or more second entities from the completed search query parameters. The method further includes searching, by the entity extraction computer, the entity co-occurrence database to identify one or more entities related to the one or more second entities so as to form one or more second suggested search query parameters, and presenting, by the entity extraction computer, the one or more second suggested search query parameters via the user interface.

In another embodiment, a system is disclosed. The system comprises one or more server computers having one or more processors executing computer readable instructions for a plurality of computer modules including an entity extraction module configured to receive user input of partial search query parameters from a user interface, the partial search query parameters having at least one incomplete search query parameter, the entity extraction module being further configured to extract one or more first entities from the partial search query parameters by comparing the partial search query parameters with an entity co-occurrence database having instances of co-occurrence of the one or more first entities in an electronic data corpus and identifying at least one entity type corresponding to the one or more first entities in the partial search query parameters. The system further includes a fuzzy-score matching module configured to select a fuzzy matching algorithm for searching the entity co-occurrence database to identify one or more records associated with the partial search query parameters, wherein the fuzzy matching algorithm corresponds to the at least one identified entity type. The fuzzy-score matching module is further configured to search the entity co-occurrence database using the selected fuzzy matching algorithm and form one or more first suggested search query parameters from the one or more records based on the search, and present the one or more first suggested search query parameters via the user interface. Additionally, the entity extraction module is further configured to receive user selection of the one or more first suggested search query parameters so as to form completed search query parameters, extract one or more second entities from the completed search query parameters, search the entity co-occurrence database to identify one or more entities related to the one or more second entities so as to form one or more second suggested search query parameters, and present the one or more second suggested search query parameters via the user interface.

DEFINITIONS

As used here, the following terms may have the following definitions:

"Entity extraction" refers to computer information processing methods for extracting information such as names, places, and organizations.

"Corpus" refers to a collection of one or more electronic documents.

"Features" is any information which is at least partially derived from a document.

"Module" refers to one or more computer hardware and/or software components suitable for carrying out at least one or more tasks.

"Fact" refers to objective relationships between features.

"Entity knowledge base" refers to an electronic database containing features/entities.

"Query" refers to an electronic request to retrieve information from one or more suitable databases.

"Topic" refers to a set of thematic information which is at least partially derived from a corpus.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
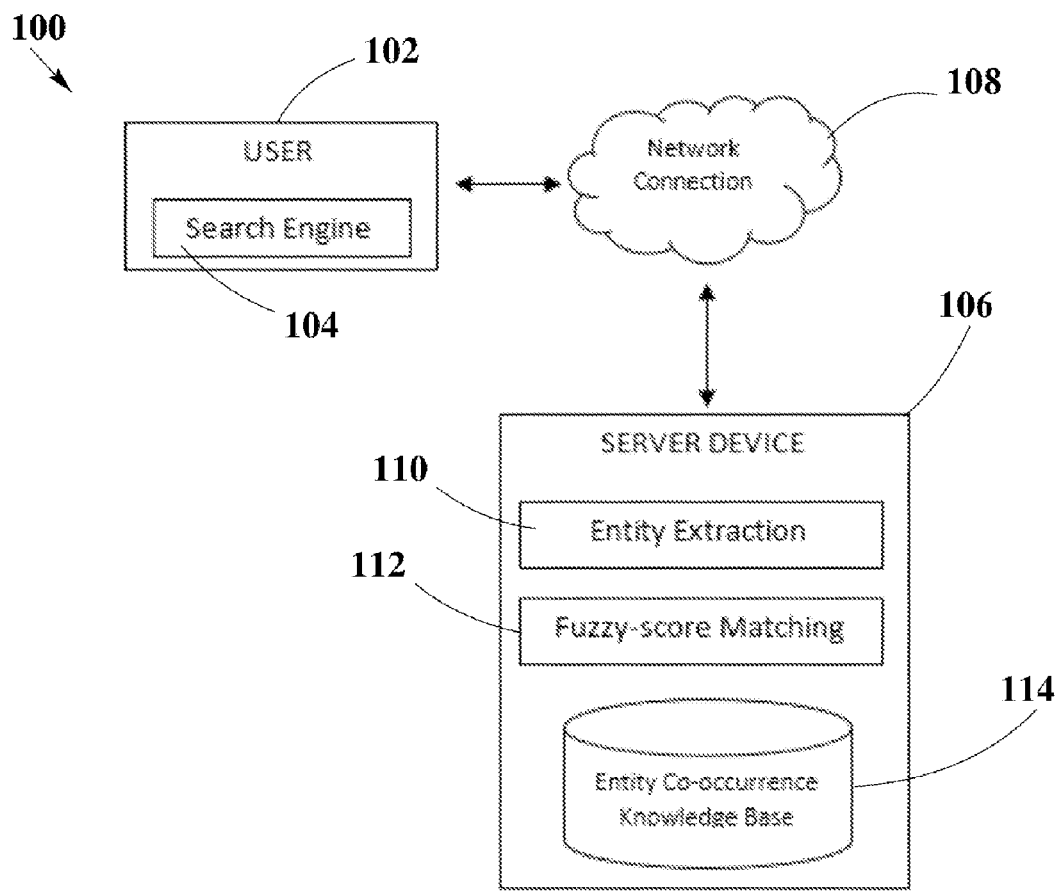
FIG. 1 is a block diagram illustrating an exemplary system environment in which one embodiment of the present disclosure may operate.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Embodiments of the present disclosure introduce a novel electronic search suggestion generation mechanism which is different from the existing mechanisms that are based on mining and ranking the activity of the search system's global users' past search queries. The presented search suggestion mechanism, is based on employing an entity co-occurrence knowledge base in its core, along with fuzzy matching modules and entity extraction modules. The entity co-occurrence knowledge base, is an electronic repository where entities may be indexed as entities to entities, entities to topics, or entities to facts among others, and stored in a way to allow faster and weighted responses. In brief, the user partial/complete queries are processed on-the-fly to detect entities (entity extraction), misspelled variations (fuzzy matching) of the entities and other conceptual features. These features are employed to search (fuzzy score matching) entity co-occurrence knowledge base to suggest search queries and possible expansions/suggestions of the accurate entities intended by the user, which will lead to a more accurate search experience. Further, once the suggested entity is chosen, the proposed system would suggest related entities that are present in the entity co-occurrence knowledge base, which will lead to an improved consecutive search experience, as discussed in further detail in FIGS. 1-3 below.

FIG. 1 is a block diagram of a search system 100 in accordance with the present disclosure. The search system 100 may include one or more user interfaces 102 to a search engine 104 in communication with a server device 106 over a network 108. In this embodiment, the search system 100 may be implemented in a client/server type architecture; however, the search system 100 may be implemented using other computer architectures (for example, a stand-alone computer, a mainframe system with terminals, an ASP model, a peer to peer model and the like) and a plurality of networks such as, a local area network, a wide area network, the internet, a wireless network, a mobile phone network and the like.

A search engine 104 may include, but is not limited to, an interface via a web-based tool that enables users to locate information on the World Wide Web. Search engine 104 may also include tools that enable users to locate information within internal database systems. Server device 106, which may be implemented in a single server device 106 or in a distributed architecture across a plurality of server computers, may include an entity extraction module 110, a fuzzy-score matching module 112, and an entity co-occurrence knowledge base database 114.

Entity extraction module 110 may be a hardware and/or software computer module able to extract and disambiguate on-the-fly independent entities from a given set of queries such as a query string, partial query, structured data and the like. Example of entities may include people, organizations, geographic locations, dates and/or time. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model.

Fuzzy-score matching module 112 may include a plurality of algorithms that may be adjusted or selected according to the type of entity extracted from a given search query. The function of the algorithms may be to determine whether the given search query (input) and suggested searched strings are similar to each other, or approximately match a given pattern string. Fuzzy matching may also be known as fuzzy string matching, inexact matching, and approximate matching. Entity extraction module 110 and fuzzy-score matching module 112 may work in conjunction with Entity co-occurrence knowledge base 114 to generate search suggestions for the user.

According to various embodiments, entity co-occurrence knowledge base 114 may be built, but is not limited to, as an in-memory database and may include components such as one or more search controllers, multiple search nodes, collections of compressed data, and a disambiguation module. One search controller may be selectively associated with one or more search nodes. Each search node may be capable of independently performing a fuzzy key search through a collection of compressed data and returning a set of scored results to its associated search controller.

Entity co-occurrence knowledge base 114 may include related entities based on features and ranked by a confidence score. Various methods for linking the features may be employed, which may essentially use a weighted model for determining which entity types are most important, which have more weight, and, based on confidence scores, determine how confident the extraction of the correct features has been performed.

Figure 2:
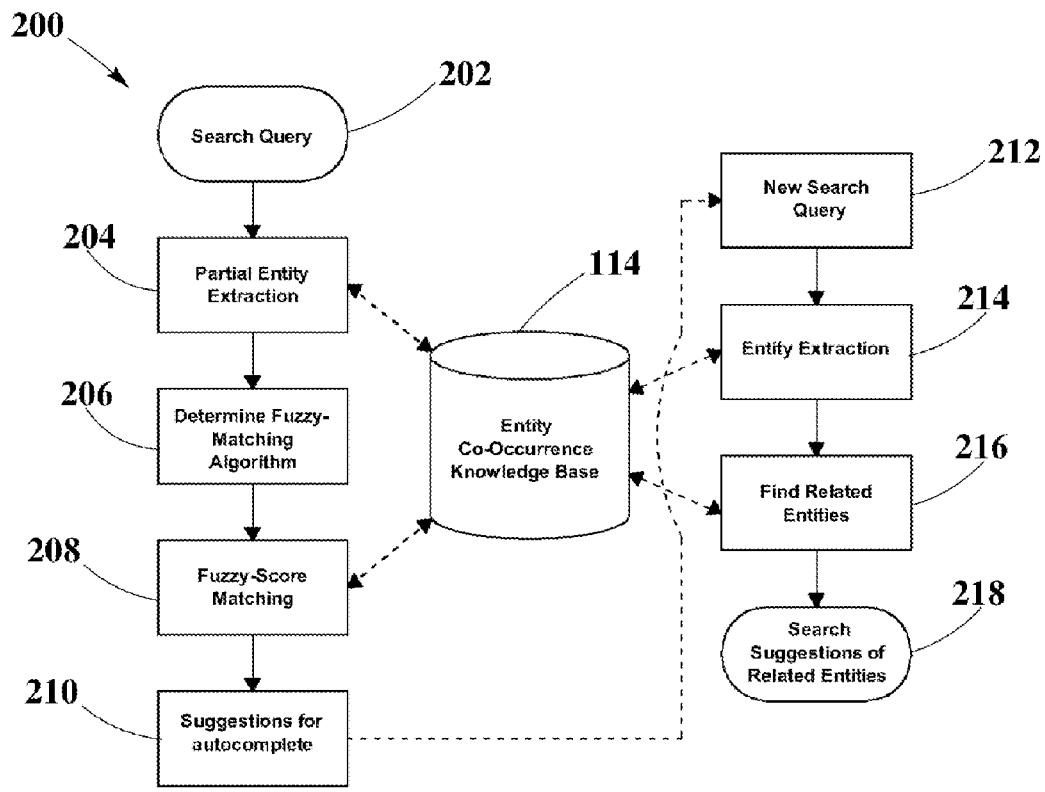
FIG. 2 is a flowchart illustrating a method for generating search suggestions of related entities based on co-occurrence and/or fuzzy score matching, according to an embodiment.

FIG. 2 is a flowchart illustrating an embodiment of a method 200 for generating search suggestions of related entities based on co-occurrence and/or fuzzy score matching. Method 200 may be implemented in a search system 100, similar to as described in FIG. 1.

In one embodiment, method 200 may initiate when a user starts typing a search query, step 202, in the search engine 104, as described above in FIG. 1. As the search query is typed, search system 100 may perform an on-the-fly process. According to various embodiments, search query may be complete and/or partial, correctly spelled and/or misspelled. Next, a partial entity extraction step 204 of search query may be performed. The partial entity extraction step 204 may run a quick search against entity co-occurrence knowledge base 114 to identify whether the search query includes an entity and, if so, the entity type. According to various embodiments, search query entity may refer to a person, an organization, the location of a place, and a date among others. Once the entity is, a fuzzy-score matching module 112 may select a corresponding fuzzy matching algorithm, step 206. For example, if search query was identified as an entity that is referring to a person, then fuzzy-score matching module 112 may adjust or select the string matching algorithm for persons, which can extract different components of the person's name, including first, middle, last, and title. In another embodiment, if search query was identified as an entity that is referring to an organization, then fuzzy-score matching module 112 may adjust or select the string matching algorithm for organizations, which can include identifying terms such as school, university, corp., and inc. Fuzzy-score matching module 112 therefore adjusts or selects the string matching algorithm for the type of entity in order to facilitate the search. Once the string matching algorithm is adjusted or selected to correspond to the type of entity, a fuzzy-score matching may be performed in step 208.

In fuzzy-score matching step 208, extracted entity or entities, as well as any non-entities, may be searched and compared against entity co-occurrence knowledge base 114. Extracted entity or entities may include incomplete names of persons, for example first name and the first character of the last name, abbreviations of organizations, for example "UN" that may stand for "United Nations", short forms, and nicknames among others. Entity co-occurrence knowledge base 114 may already have registered a plurality of records indexed in an structured data, such as entity to entity, entity to topics, and entity to facts index among others. This may allow fuzzy-score matching in step 208 to happen expeditiously. Fuzzy-score matching may use, but is not limited to, a common string metric such as Levenshtein distance, strcmp95, ITF scoring, and the like. Levenshtein distance between two words may refer to the minimum number of single-character edits required to change one word into the other.

Once fuzzy-score matching in step 208 step finishes comparing and searching the search query against all records in the entity co-occurrence knowledge base 114, the record that dominates the most or is the closest to match the given pattern string of the search query input may be selected as first candidate for a search suggestion, step 210. Other records with less proximity to match the given pattern string of the search query input may be placed under the first candidate in a descending order. Search suggestion in step 210 may then be presented to the user in a drop down list of possible matches that the user may select to complete the query.

In another embodiment, after the user selects a match of his/her interest, search system 100 may take that selection as a new search query, step 212. Subsequently, an entity extraction step 214 from said new search query may be performed. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model. Entity extraction module 110 may then run a search against entity co-occurrence knowledge base 114 to find related entities, step 216, based on the co-occurrences with the highest scores. Finally, a drop down list of search suggestions, in step 218, including related entities, may be presented to the user before performing the actual search of the data in the electronic document corpus.

Figure 3:
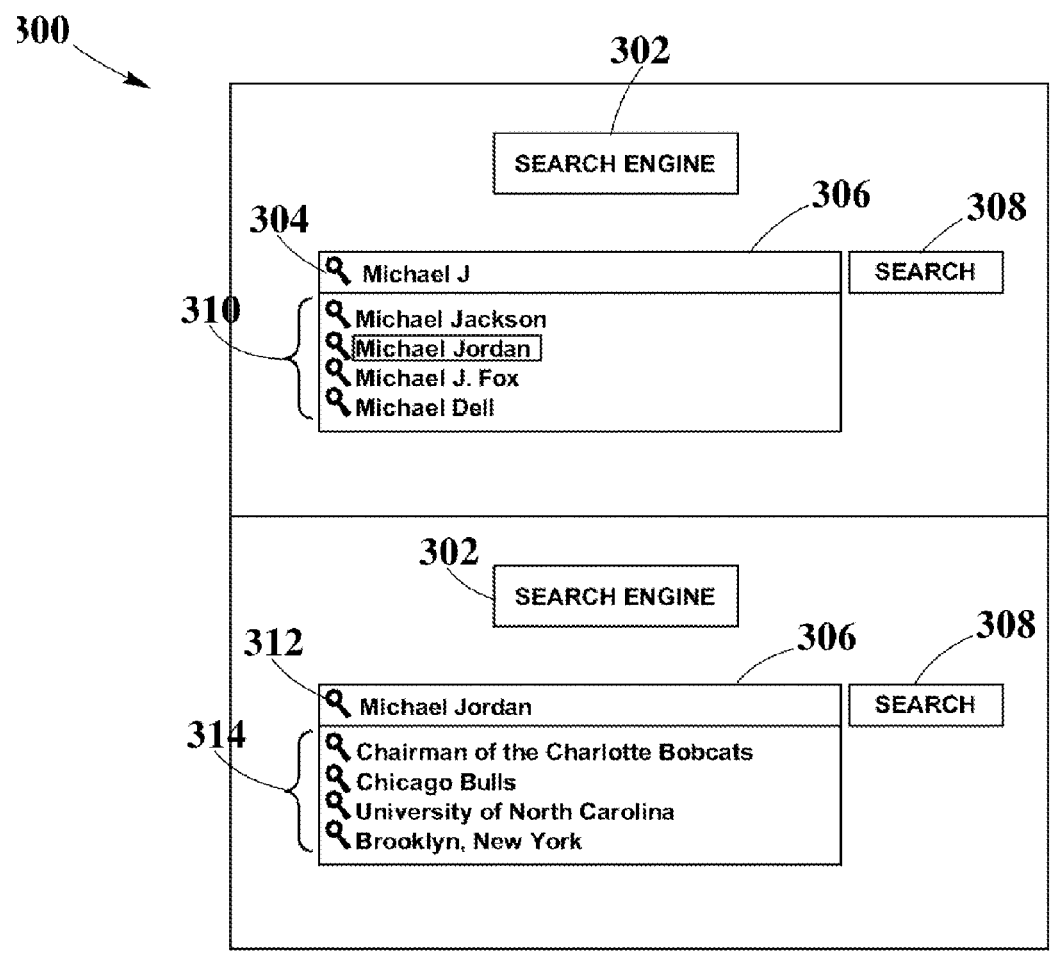
FIG. 3 is an example embodiment of a user interface associated with the method described in FIG. 2.

FIG. 3 is an example embodiment of a user interface 300 associated with the method 200 for generating search suggestions of related entities based on co-occurrence and/or fuzzy score matching. In this example, a user through a search engine interface 302, similar to that described by FIG. 1, inputs a partial query 304 in a search box 306. By a way of illustration and not by way of limitation, partial query 304 may be an incomplete name of a person such as "Michael J", as shown in FIG. 3. It may be considered a partial query 304 because the user may not have yet selected search button 308, or otherwise submitted the partial query 304 to search system 100 to perform an actual search and obtain results.

Following the method 200, as the user types "Michael J", the entity extraction module 110 performs a quick search on-the-fly of the first word (Michael) against entity co-occurrence knowledge base 114 to identify the type of entity, in this example, the entity may refer to the name of a person. Subsequently, fuzzy-score matching module 112 may select a string match algorithm tailored for names of persons. Name of persons may be found in databases written in different forms such as using only initials (short forms), or first name and first character of the last name, or first name, initial of the middle name and last name, or any combination thereof. Fuzzy-score matching module 112 may use a common string metric such as Levenshtein distance to determine and assign a score to the entity, topic, or fact within entity co-occurrence knowledge base 114 that may match the entity "Michael". In this example, Michael matches with a great amount of records having that name. However, as the user types the following character "J", fuzzy-score matching module 112 may perform another comparison based on Levenshtein distance against all co-occurrences with Michael with the entity co-occurrence knowledge base 114. Entity co-occurrence knowledge base 114 may then select all possible matches with the highest scores for "Michael J". For example, fuzzy-score matching module 112 may return search suggestions 310 to complete "Michael J" such as "Michael Jackson", "Michael Jordan", "Michael J. Fox", or even "Michael Dell" in some cases to the user. The user may then be able to either select from the drop down list one of the persons suggested, or ignore the suggestion and keep typing. Expanding on the aforementioned example, a query like "Michael the basketball player", would lead to the suggestion of "Michael Jordan", based on the results returned by searching Entity co-occurrence knowledge base for "Michael" in person entity name variations and "the basketball player" in the co-occurrence features like key phrases, facts, topics, and the like. Another example can be "Alexander the actor", would lead to the suggestion of "Alexander Polinsky". As those skilled in the art will realize, the existing search platforms cannot provide suggestions generated in the aforementioned manner.

In this embodiment, the user may select "Michael Jordan" from the drop down list to complete the partial query 304, as indicated in FIG. 3. Said selection may then be processed as a new search query 312 by search system 100. Subsequently, an entity extraction from said new search query 312 may be performed. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model. Entity extraction module 110 may then run a search for "Michael Jordan" against entity co-occurrence knowledge base 114 to find related entities based on the co-occurrences with the highest scores. Finally, a drop down list of search suggestions 314, including related entities, may be presented to the user before performing the actual search by clicking on the search button 308. The foregoing system and method described in FIGS. 1-3 may be fast and convenient for the user since the user may find useful relationships.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method comprising:
   in real-time, as search query data is requested by a client:
      extracting, by a server, a first entity from a partial search query parameter, wherein the partial search query parameter comprises an incomplete search query parameter, wherein the extracting is based on a comparison of the partial search query parameter against an instance of co-occurrence of the first entity in a data corpus and an identification of an entity type corresponding to the first entity, wherein the instance of co-occurrence of the first entity is stored in an entity co-occurrence database, wherein the server comprises a main memory storing an in-memory database which comprises the entity co-occurrence database,
      selecting, by the server, a fuzzy matching process which is able to search the entity co-occurrence database and identify a record associated with the partial search query parameter, wherein the fuzzy matching process corresponds to the entity type and returns a confidence score and a ranking based on the confidence score,
      searching, by the server, the entity co-occurrence database via the fuzzy matching process,
      forming, by the server, based on the searching, a first suggested search query parameter based on the record;
   sending, by the server, the first suggested search query parameter to the client;
   receiving, by the server, a selection from the client, wherein the selection selects the first suggested search query parameter;
   forming, by the server, a completed search query parameter based on the selection;
   extracting, by the server, a second entity from the completed search query parameter;
   identifying, by the server, a third entity in the entity co-occurrence database, wherein the third entity is related to the second entity; and
   sending, by the server, a second suggested search query parameter to the client, wherein the second suggested search query parameter is based on the third entity.

2. The method of claim 1, further comprising:
   extracting, by the server, a feature from the data corpus; and
   assigning, by the server, the confidence score to the feature, wherein the confidence score indicates a level of certainty of the feature being extracted with a correct attribute.

3. The method of claim 1, wherein the searching is before the search query data is finalized.

4. The method of claim 1, wherein the record comprises a conceptual feature.

5. The method of claim 1, wherein the first suggested search query parameter comprises a plurality of first suggested search query parameters, wherein the method further comprising:
   sorting, by the server, the first suggested search query parameters in a descending order based on a proximity of a match to the partial search query parameter.

6. The method of claim 4, wherein the sending of the first suggested search query parameter to the client is such that the first suggested search query parameter is presented on the client in a drop down list.

7. The method of claim 1, wherein the entity co-occurrence database is indexed.

8. The method of claim 1, wherein the entity co-occurrence database includes an entity-to-entity index.

9. The method of claim 1, wherein the entity co-occurrence database includes an entity-to-topic index.

10. The method of claim 1, wherein the entity co-occurrence database includes an entity-to-facts index.

11. A system comprising:
a server configured to:
in real-time, as search query data is requested by a client:
extract a first entity from a partial search query parameter, wherein the partial search query parameter comprises an incomplete search query parameter, wherein the extraction is based on a comparison of the partial search query parameter against an instance of co-occurrence of the first entity in a data corpus and an identification of an entity type corresponding to the first entity, wherein the instance of co-occurrence of the first entity is stored in an entity co-occurrence database, wherein the server comprises a main memory storing an in-memory database which comprises the entity co-occurrence database,
select a fuzzy matching process which is able to search the entity co-occurrence database and identify a record associated with the partial search query parameter, wherein the fuzzy matching process corresponds to the entity type and returns a confidence score and a ranking based on the confidence score,
search the entity co-occurrence database via the fuzzy matching process,
form, based on the search, a first suggested search query parameter based on the record;
send the first suggested search query parameter to the client;
receive a selection from the client, wherein the selection selects the first suggested search query parameter;
form a completed search query parameter based on the selection;
extract a second entity from the completed search query parameter;
identify a third entity in the entity co-occurrence database, wherein the third entity is related to the second entity; and
send a second suggested search query parameter to the client, wherein the second suggested search query parameter is based on the third entity.

12. The system of claim 11, wherein the server is configured to:
extract a feature from the data corpus; and
assign the confidence score to the feature, wherein the confidence score indicates a level of certainty of the feature being extracted with a correct attribute.

13. The system of claim 11, wherein the server is configured to perform the search before the search query data is finalized.

14. The system of claim 11, wherein the record comprises a conceptual feature.

15. The system of claim 11, wherein the first suggested search query parameter comprises a plurality of first suggested search query parameters, wherein the server is configured to:
sort the first suggested search query parameters in a descending order based on a proximity of a match to the partial search query parameter.

16. The system of claim 14, wherein the server is configured to send the first suggested search query parameter to the client such that the first suggested search query parameter is presented on the client in a drop down list.

17. The system of claim 11, wherein the entity co-occurrence database is indexed.

18. The system of claim 11, wherein the entity co-occurrence database includes an entity-to-entity index.

19. The system of claim 11, wherein the entity co-occurrence database includes an entity-to-topic index.

20. The system of claim 11, wherein the entity co-occurrence database includes an entity-to-facts index.

* * * * *